*INVENTOR.*
LOUIS M. PUSTER

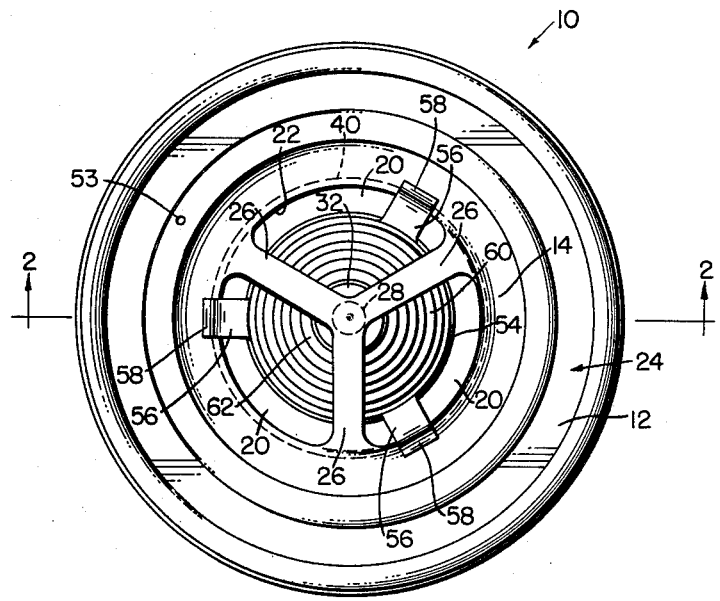

ATTORNEY

United States Patent Office 3,127,104
Patented Mar. 31, 1964

3,127,104
REVERSE ACTING POPPET TYPE THERMOSTATIC
VALVE CONSTRUCTION
Louis M. Puster, Knoxville, Tenn., assignor to Robertshaw Controls Company, a corporation of Delaware
Filed Oct. 2, 1961, Ser. No. 142,279
13 Claims. (Cl. 236—34)

This invention relates to a reverse acting poppet type thermostatic valve construction.

One of the features of this invention is the manufacture of a valve construction from a plurality of efficiently assembled unitary components, including a mounting body, a power unit, a valve, a spring supporting structure, and a coil compression spring. These components may be readily assembled by simple pressing and telescoping procedures without the use of additional fasteners and the like, to produce a superior valve construction by an efficient and cost saving method.

More specifically, a unitary mounting body may be made from a single sheet metal stamping to form an outer mounting flange, and intermediate valve seat, a central fluid flow construction with a central upper thrust seat and a web construction which forms a plurality of fluid flow openings with opening edges adjacent the valve seat. A thermal unitary power unit may be made of the type which has an expansion piston at its upper end to engage the thrust seat and has a main body below the piston with a spring receiving means or enlarged flange adjacent the piston, and with a heat sensitive element at its lower end to actuate the piston in response to fluid temperatures.

A unitary valve may be formed from a single piece of sheet metal to produce a double side walled structure having inner and outer walls sealed together at the adjacent lower edges. The inner wall may be sealed to and secured to said main body of the power unit and said outer wall may have a fluid sealing edge which engages the valve seat.

A unitary spring supporting structure may be formed from a single piece of sheet metal to produce a spring receiver or ring to surround said main body of the power unit and the inner wall of the valve. The spring supporting structure may also have upwardly directed supporting legs with hooks which may be engaged over the lower edges of the fluid openings.

A unitary coiled compression spring may be provided to have one end engage the spring receiving means or flange of the power unit at its upper end and to have its other end engage said spring receiver or ring at the lower end of the spring.

The unitary mounting body may be made of a single piece of sheet metal which may be cut and press formed into its final shape. Likewise the spring supporting structure may be made of a unitary piece of sheet metal which may be cut and formed into its final form. Likewise the valve may be made from a unitary piece of sheet metal which may be cut and formed into its final shape. The power unit is of the standard construction now on the market with modifications to adapt it for this particular invention. The coiled spring may be a unitary component readily shaped and cut to size for use in this invention.

Hence all of these parts may be readily and quickly assembled by simple telescoping and pressing procedures, and without the use of additional fasteners and the like.

Accordingly, it is an object of this invention to provide a reverse acting poppet type thermostatic valve construction having one or more of the features herein disclosed.

Another object of this invention is to provide a method of manufacturing the thermostatic valve construction of this invention.

Other objects are apparent from this description and the accompanying drawings in which:

FIGURE 1 is a top plan view of a valve construction embodying this invention.

FIGURE 2 is a vertical cross section along the line 2—2 of FIGURE 1.

FIGURE 3 is a view of a portion of FIGURE 2 and showing the valve in open position.

For the sake of brevity and clearness certain words are used, such as adjectives describing direction and relative position, such as "upper," "lower," "lateral," "horizontal," etc. However it is to be understood that the parts so described actually may have other directions and relative positions when in actual use.

Figure 4:
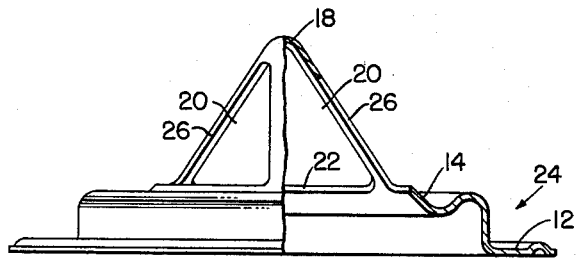
FIGURE 4 is a side view of the mounting body, partly in elevation and partly in cross section.
Figure 7:
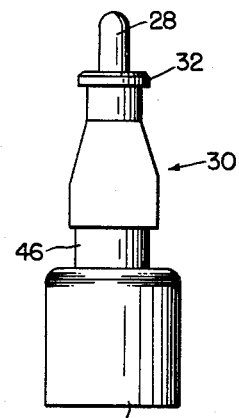
FIGURE 7 is a side view of the power unit.

According to this invention the valve construction may have a unitary mounting body 10, FIGURES 1, 2 and 4, which has an outer mounting flange 12, and intermediate valve seat 14, which may be frusto-conical, and a central dome construction 16, which may be conical with a thrust seat 18 at the top or apex and a plurality of fluid flow openings 20 along the side of the dome with the lower edges 22 of the openings 20 adjacent the valve seat 14.

More specifically the mounting body 10 may be made of a unitary sheet metal piece which may be cut and formed to produce the shape shown in the drawings. The flange 12 may be of suitable shape to be received in the particular engine construction or the like in which it is to be used. The flange may be contoured at 24 so that it terminates in the upwardly slanting or cone shaped valve seat 14. The sheet metal may continue the cone shape, if desired, in the form of a plurality of web members 26, such as three slanting webs, which form the openings 20 between the webs. The openings 20 may have lower opening edges 22 adjacent the valve seat 14. The thrust seat 18 may be a smoothly curved dome at the apex to receive the rounded end of the expansion piston 28.

A unitary power unit has the expansion piston 28 at its upper end to engage the thrust seat 18. The power unit has a cylindrical main body 30. The main body may have a spring upper end receiving means or enlarged shoulder 32 adjacent the upper end of said main body adjacent to the expansion piston 28 and may have a heat sensitive element 34 adjacent its lower end which element actuates the piston 28 in response to fluid temperatures adjacent element 34.

A unitary valve 36 may be made of a single piece of sheet metal and may have an inner wall 38 and an outer wall 40 which are sealed together at their lower ends in any suitable manner, as by a bottom wall 42 or the like, to form a double side wall valve.

The valve 36 may be secured to the cylindrical main body 30 of the power unit in any suitable manner. For example, the inner wall 38 may be formed or pressed into a smaller diameter at 44 to be sealed and press fitted into the reduced diameter grooved construction 46 of the main body 30. The inner wall 38 may continue downwardly around the bottom part or sensing element 34 of the main body 30 as indicated at 48, and this may be either a loose fit or a press fit as desired.

The outer wall 40 of the valve 36 may extend upwardly, and its upper edge 50 may guidably engage the frustoconical valve seat 14 during its upward travel. When so engaged, the valve 36, closes the upward flow of fluid past the valve seat 14, so that no substantial amount of fluid can travel from the space below the mounting body 10 to the space above the mounting body 10. When the valve 36 is open, as in FIGURE 3, the fluid travels through the openings 20. The valve 36 is open when the valve 36 and main body 30 are in a downward position such as indicated by the dotted line 52 of FIGURE 2. The edge 50 of the outer wall 40 may be machine finished with a bevel, to provide guidance during upward travel of the valve and to prevent excessive leakage when the valve 36 is closed, as shown in FIGURE 2.

However, a small leak hole 53, FIGURE 1, may be provided which permits a relatively small equalizing leakage from the engine space to the radiator space and vice versa, at all times.

A unitary spring receiver, or spring receiving ring 54 surrounds the inner wall 38, 48, of the valve 36, and also surrounds the thermal sensing element 34. The spring receiver 54 may have a plurality of upwardly directed flexible supporting legs 56 which have automatic fasteners or hooks 58 at their upper ends which are hooked over the lower edges 22 of the openings 20 or fastened to said mounting body 10 to hold the ring 54 against downward movement below the position shown in FIGURE 1, the spacing between the legs 56 of the receiver 54 defining a fluid flow permitting part of the receiver 54 as will be apparent hereinafter.

The spring receiver 54 and the legs 56 may be made from a single sheet metal piece which may be cut and formed into the shape shown in the drawings. The legs 56 are formed with a slight outward bias beyond the positions illustrated in FIGURE 1. This permits the ring 54 and the legs 56 to be pushed upwardly, during assembly, along the upwardly slanting surface of the cone shaped valve seat 14. The hooks 58 may then snap over the lower edges 22 of the openings 20 and may then be lowered into the hooked position shown in FIGURE 1.

Figure 5:
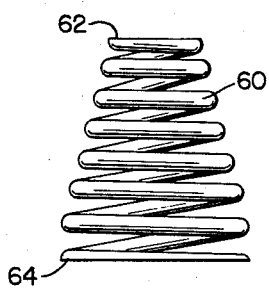
FIGURE 5 is a side view of the compression spring.
Figure 8:
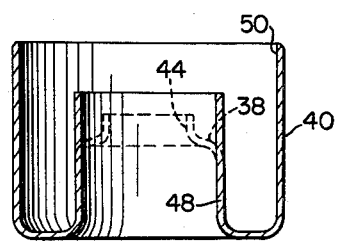
FIGURE 8 is a vertical cross section of the valve.
Figure 6:
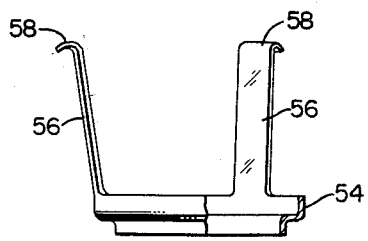
FIGURE 6 is a side view of the spring receiver or ring, partly in elevation and partly in cross section.

A unitary compression spring 60 has its upper end 62 engaging the outward flange 32 or upper spring end receiving means, and has its lower end 64 engaging the spring receiver or lower spring end supporting receiver 54. The spring 60 may be a coiled spring and may be frusto-conically shaped as shown in FIGURES 1 and 5. The lower end 64 of the spring 60 is held stationary and is supported by the spring receiver or ring 54 during all normal operations of the valve structure. The upper end 62 of the spring 60 pushes upwardly against the flange 32, and tends to hold the main body 30 of the power unit in the highest position which the spring 60 may maintain, which position maintains the valve 36 fully closed, as shown in FIGURE 1. When the expansible unit 34 is heated by the fluid adjacent it, the expansible plunger 28 tends to be pushed upwardly. However, since the thrust seat 18 does not yield upwardly, the main body 30 is moved downwardly instead, by the reaction, to the dotted line position 52 shown below the full line position of FIGURE 2. When this happens, the valve 36 also is moved downwardly, so that the upper edge 50 of the outer wall 40 is moved to a down position such as shown in FIGURE 3. This allows fluid to flow, as shown by the arrows 66 from the space below the valve seat 14, through the spacing between the legs 56 of the receiver 54 and through the openings 20 and into the space above the valve seat 14. The space below the valve seat 14 may be connected, for example, to the fluid discharge from an internal combustion engine, and the space above the valve seat 14 may be connected, for example, to a radiator for cooling the fluid which is circulated through the cooling system by the engine fluid pump, not shown.

Therefore, when the valve 36 is in the up or full line position of FIGURE 2, the engine fluid pump circulates the fluid through the engine, but not through the radiator. When the valve 36 is in a lower position such as indicated by the dotted line 52, then the engine fluid pump circulates the fluid through the radiator, to prevent overheating of the engine.

The components of the valve construction of this invention are relatively simple, unitary and easily assembled. They are so shaped that they are readily assembled without the use of fasteners or other similar devices.

The power unit 30 may be assembled as a unit, in a manner which is obvious from the illustration, and from the standard practice in the manufacture of such units. The valve 36, which may be made from a single piece of sheet metal, may be drawn and cut and then press fitted over the main body 30 of the power unit and contracted at 44 firmly to secure the valve 36 on the main body 30 of the power unit in the groove 46.

The spring receiver or ring 54 may then be placed between the walls 38 and 40 of the valve 36 with the legs 56 extending upwardly.

The coiled spring 60 may then be placed over the upper end of 28 of the power unit so the spring lower end 64 is over the spring receiver or ring 54. The upper end 62 of spring 60 may then be forced down past the flange 32 so that it pushes up, when released, against the under side of the flange 32.

If desired, the power unit may be maintained cool or may be cooled partially to contract the plunger inward a substantial amount toward the main body 30 of the power unit. Then the power unit valve 36, ring 54 and legs 56 are pushed upwardly into the mounting body 10. If necessary, the ring 54 or legs 56 may additionally be pulled up by any suitable pulling means to cause the hooks 58 of the legs 56 to move upwardly along the valve seat 14 and then to snap over the lower edges 22 of the openings 20. The upper end of the piston 28 then engages the under side of the thrust seat 18.

The valve construction is then ready for testing and/ or use when the upward pulling means are removed, if such pulling means have been used.

An alternative assembly procedure may be:

(1) Secure or press fit valve 36 on main body 30.

(2) Place spring 60 with lower end 64 in spring receiver or ring 54.

(3) Place hooks 58 of legs 56 over the lower edges 22 of openings 20 of mounting unit 10.

(4) Cool power unit 30, or maintain it cool, if necessary.

(5) Place walls 38 and 40 of valve 36 respectively inside and outside of the ring 54.

(6) Place plunger 28 in upper end 62 of coil spring 60.

(7) Force upper end 62 of spring 60 downward past and under flange 32 of power unit 30, and place piston 28 in thrust seat 18.

Release upper end 62 of spring 60.

Remove the completed valve construction from the assembly line or apparatus for testing, if necessary, and for use in an engine cooling system and the like.

It is thus to be seen that this invention provides a valve construction which is very simple and efficient. Simple unitary components are also used which can be assembled in a very efficient manner and without the use of fasteners and the like.

While the form of the invention now preferred has been disclosed as required by statute, other forms may be used, all coming within the scope of the claims which follow.

What is claimed is:

1. In combination: a mounting body having an outer mounting flange, an intermediate valve seat and a central dome construction with a thrust seat at the top and a plurality of fluid flow openings along the side of said dome with lower edges adjacent said valve seat; a power unit having an expansion piston at its upper end engaging said thrust seat and having a cylindrical main body below said piston with an enlarged shoulder below and adjacent said piston and with a heat sensitive element at its lower end to actuate said piston in response to fluid temperature; a valve having inner and outer walls sealed together at their lower ends, said inner wall being sealed and secured to said cylindrical main body and said outer wall having an upper edge engaging said valve seat; a spring reeciving ring surrounding said inner wall in telescoping relation therewith and having upward supporting legs hooked over said opening lower edges; and a compression spring having its upper end engaging said enlarged shoulder at its upper end and said spring receiving ring at its lower end.

2. In combination: a unitary sheet metal mounting body having an outer mounting flange, an intermediate valve seat and a central dome construction with a thrust seat at its top and a plurality of web members extending from said valve seat to said thrust seat and forming a plurality of fluid flow openings along the side of said dome with lower edges adjacent said valve seat; a power unit having an expansion piston at its upper end engaging said thrust seat and having a cylindrical main body below said piston with an enlarged shoulder below and adjacent said piston and with a heat sensitive element at its lower end to actuate said piston in response to fluid temperature; a sheet metal valve having inner and outer walls integrally sealed together at their lower ends, said inner wall being sealed and secured to said cylindrical main body and said outer wall having an upper edge engaging said valve seat; a unitary sheet metal spring supporting structure having a spring receiving ring surrounding said inner wall in telescoping relation therewith and having integral upward supporting legs with hooks at their upper ends hooked over said lower edges of said fluid flow openings; and a coiled compression spring having its upper end engaging said enlarged shoulders and having its lower end engaging said spring receiving ring.

3. In combination: a unitary mounting body having an outer mounting flange, an intermediate valve seat, and a central fluid flow construction with a central thrust seat and a web construction forming a plurality of fluid flow openings with opening edges adjacent said valve seat; a power unit having an expansion piston at its upper end engaging said thrust seat and having a main body below said piston with a spring receiving means adjacent said piston and with a heat sensitive element at its lower end to actuate said piston in response to fluid temperatures; a unitary valve having inner and outer walls sealed together at their adjacent edges, said inner wall being sealed to and secured to said main body and said outer wall having an edge engaging said valve seat; a unitary spring supporting structure having a spring receiver surrounding said main body in telescoping relation therewith and having supporting legs with hooks hooked over said opening edges; and a coiled compression spring having one end engaging said spring receiving means of said main body and having its other end engaging said spring receiver of said unitary spring supporting structure.

4. The method of manufacturing a valve construction which comprises: press fitting a double side walled valve on a cylindrical body of a thermal power unit; placing a spring receiver with upward legs and hooks between the double side walls of said valve; placing a coiled compression spring with its lower end over said spring receiver; forcing the upper end of said coiled spring under an enlarged shoulder which is below and adjacent an expansion piston at the upper end of said power unit; hooking the hooks of said legs over the bottom edges of fluid flow openings in a central dome of a mounting body; and placing the upper end of said expansion piston in a thrust seat at the upper part of said central dome.

5. The method of manufacturing a valve construction which comprises: securing the inner wall of a valve having inner and outer walls on a main body of a thermal power unit; placing a coiled spring with its lower end in a spring receiver which has upward legs; placing end hooks of said legs over the lower edges of fluid flow openings of a mounting unit; placing said inner and outer walls of said valve respectively inside and outside said spring receiver; placing a plunger of said power unit in the upper end of said spring; forcing the upper end of said spring downward past and under a spring retaining flange on said power unit; placing said piston in a thrust seat of said mounting unit; and releasing said upper end of said spring.

6. The method of manufacturing a valve construction from unitary components including a valve having inner and outer walls, a power unit having a main body, a plunger and a spring retaining flange, a spring receiver having upward legs with end hooks at the ends of said legs, a coiled spring having upper and lower ends, and a mounting unit having fluid flow openings with lower edges and with a thrust seat, which method comprises: assembling said unitary units in unitary condition with said inner wall of said valve secured to said body of said power unit, with the lower end of said spring in said spring receiver, with the hooks of said legs of said spring receiver over said lower edges of said openings, with said plunger past the upper end of said spring and in said thrust seat, and with the upper end of said spring forced down and under said spring retaining flange.

7. The method of manufacturing a valve construction from unitary components including a valve having inner and outer walls, a power unit having a main body, a plunger and a spring retaining flange, a spring receiver having upward legs with end hooks at the ends of said legs, a coiled spring having upper and lower ends, and a mounting unit having fluid flow openings with lower edges and with a thrust seat, which method comprises: securing said inner wall of said valve to said body of said power unit; placing the lower end of said spring in said spring receiver; placing said hooks of said legs over said lower edges of said openings; forcing said plunger past said upper end of said spring and into said thrust seat; and forcing the upper end of said spring down and under said spring retaining flange.

8. In combination: a mounting body having an outer mounting flange, an intermediate valve seat, and a central fluid flow construction with a central thrust seat surrounded by a fluid flow construction with an edge construction adjacent said valve seat construction; a power unit having an expansion piston engaging said thrust seat and having a main body below said piston with a spring receiving means on said main body and with a heat sensitive element to actuate said piston in response to fluid temperatures; a valve sealed and secured to said main body and having a sealing edge engaging said valve seat; a spring supporting structure having a spring receiver surrounding said main body in telescoping relation therewith and having supporting legs with attaching means on said legs attached to said edge construction; and a coiled compression spring having one end engaging said spring receiving means of said main body and having its other end engaging said spring receiver of said spring supporting structure.

9. In combination: a mounting body having an outer mounting flange, an intermediate upwardly frusto-conical valve seat with a fastening portion above said valve seat, and a central upwardly conical fluid flow construction forming an extension of said valve seat and terminating in a thrust seat at the apex of said conical construction, said thrust seat of said mounting body being disposed above said fastening portion of said mounting body; a power unit having an expansion piston engaging said thrust seat and having a main body below said piston with a spring receiving means on said main body and with a heat sensitive element to actuate said piston in response to fluid temperatures; a valve sealed and secured to said main body and having an upward circular sealing edge engageable with the under surface of said frusto-conical valve seat; a spring supporting structure having a spring receiver surrounding said main body in telescoping relation therewith and flexibly secured to said fastening portion above said valve seat; and a coiled compression spring having one end engaging said spring receiving means of said main body and having its other end engaging said spring receiver of said spring supporting structure.

10. In combination: a mounting body having an outer mounting flange and an upward cone construction including a frusto-conical valve seat, an upwardly slanting fluid flow construction and a thrust seat at the apex of said cone construction; a power unit having an expansion piston engaging said thrust seat and having a main body extending downwardly past said valve seat with a heat sensitive element adjacent the bottom of said main body; upper spring receiving means on the upper part of said main body; a valve sealed and secured to said main body and having an upward circular edge guidably engageable with the under surface of said frusto-conical valve seat; a lower spring supporting structure having a lower spring receiver surrounding said main body in telescoping relation therewith and supported from said mounting body at a point spaced below said thrust seat of said mounting body by a fluid flow permitting part of said lower spring receiver that permits flow from said valve seat to pass through said fluid flow part to said flow construction; and a circularly cross sectioned compression spring having its upper end engaging said upper spring receiving means, and having its lower end engaging said lower spring receiver.

11. In combination: a unitary mounting body having an outer mounting flange, a frusto-conical valve seat, an upwardly directed fluid flow construction above said valve seat and a thrust seat centrally of said fluid flow construction; a power unit having an expansion piston engaging said thrust seat and having a main body extending downwardly past said valve seat with a heat sensitive element adjacent the bottom of said main body; upper spring end receiving means on said main body; a valve sealed and secured to said main body and having an upward circular edge guidably engageable with the under surface of said frusto-conical valve seat; a lower spring end supporting receiver below said valve seat and supported from said mounting body at a point spaced below said thrust seat of said mounting body by a fluid flow permitting part of said lower spring receiver that permits flow from said valve seat to pass through said fluid flow part to said flow construction; and a compression spring having its upper end engaging said upper spring end receiving means and having its lower end engaging said lower spring end supporting receiver.

12. A combination according to claim 11 in which said compression spring is a frusto-conical coiled spring.

13. A combination according to claim 11 in which said valve has outer and inner circular walls with the lower edges of said walls sealed together and with the upward circular edge of the outer wall engaging said valve seat, and with the inner wall secured to said main body.

References Cited in the file of this patent
UNITED STATES PATENTS
2,872,117    Puster _____ Feb. 3, 1959